United States Patent
Yoshimoto

(10) Patent No.: US 7,404,395 B2
(45) Date of Patent: Jul. 29, 2008

(54) DEVICES AND METHODS FOR CONDITIONING OR VAPORIZING LIQUID FUEL IN AN INTERMITTENT COMBUSTION ENGINE

(76) Inventor: Hitoshi Yoshimoto, 35 Matsugasaki Sakuragi-Cho, Sakyo-Ku, Kyoto 606-0902 (JP)

( * ) Notice: Subject to any disclaimer, the term of this patent is extended or adjusted under 35 U.S.C. 154(b) by 0 days.

(21) Appl. No.: 11/383,944

(22) Filed: May 17, 2006

(65) Prior Publication Data
US 2006/0260581 A1 Nov. 23, 2006

Related U.S. Application Data

(63) Continuation-in-part of application No. 11/133,147, filed on May 18, 2005.

(51) Int. Cl.
*F02M 27/06* (2006.01)
(52) U.S. Cl. .................. 123/538; 123/557; 123/143 B
(58) Field of Classification Search ............. 123/536, 123/538, 557, 143 B
See application file for complete search history.

(56) References Cited

U.S. PATENT DOCUMENTS

| | | | |
|---|---|---|---|
| 4,005,683 A | 2/1977 | Whitt | |
| 4,434,753 A | 3/1984 | Mukainakano et al. | |
| 4,556,020 A | 12/1985 | Hickling | |
| 4,672,938 A | 6/1987 | Hoppie et al. | |
| 4,726,336 A | 2/1988 | Hoppie et al. | |
| 4,852,529 A * | 8/1989 | Vowles ................ | 123/143 B |
| 5,027,764 A | 7/1991 | Reimann | |
| 5,328,665 A * | 7/1994 | Geiger ................ | 123/143 B |
| 5,361,737 A | 11/1994 | Smith et al. | |
| 5,367,869 A | 11/1994 | DeFreitas | |
| 5,404,712 A * | 4/1995 | Few et al. ............. | 60/39.821 |
| 5,515,681 A | 5/1996 | DeFreitas | |
| 5,806,483 A | 9/1998 | Mitarai et al. | |
| 5,829,419 A * | 11/1998 | Sadkin et al. ......... | 123/538 |
| 5,845,480 A * | 12/1998 | DeFreitas et al. ....... | 123/536 |
| 5,983,871 A | 11/1999 | Gordon et al. | |

(Continued)

FOREIGN PATENT DOCUMENTS

DE 19629171 1/1998

(Continued)

OTHER PUBLICATIONS

Author Unknown, "Pulse Detonation Rocket Engines", Advanced Space Transportation Technology Summary, www.nasa.gov/centers/marshall/pdf/100369main_pulse_detonate.pdf., Jul. 21, 2005.

(Continued)

*Primary Examiner*—Erick Solis
(74) *Attorney, Agent, or Firm*—Thorpe North & Western LLP

(57) ABSTRACT

A device and method for conditioning and/or volumetric heating fuel within an intermittent combustion engine in order to enhance fuel combustion and emission performance is provided. Such a device can include a fuel injector configured to eject a fuel spray having a trajectory within a combustion chamber, an energy source capable of emitting electromagnetic energy, and an optical fiber configured to transmit electromagnetic energy emitted from the energy source into the combustion chamber, and is also configured to cause fuel conditioning.

48 Claims, 6 Drawing Sheets

U.S. PATENT DOCUMENTS

| | | | |
|---|---|---|---|
| 6,514,069 B1 * | 2/2003 | Early et al. | 123/143 B |
| 6,581,581 B1 | 6/2003 | Bebich | |
| 6,676,402 B1 * | 1/2004 | Early et al. | 123/143 B |
| 6,782,875 B2 | 8/2004 | Yoshimoto | |
| 7,114,858 B2 * | 10/2006 | Gupta et al. | 123/143 B |
| 2003/0041844 A1 | 3/2003 | Yoshimoto | |

FOREIGN PATENT DOCUMENTS

| | | |
|---|---|---|
| DE | 19646201 | 5/1998 |
| DE | 10041055 | 3/2002 |
| FR | 2666751 | 3/1992 |
| GB | 2185783 A | 7/1987 |
| JP | 10196471 | 7/1998 |
| WO | WO 98/51924 | 11/1998 |

OTHER PUBLICATIONS

Ahern, B. et al., "Dramatic Emissions Reductions with a Direct Injection Diesel Engine Burning Supercritical Fuel/Water Mixtures", Society of Automotive Engineers, Inc. (SAE) Paper 2001-01-3526, pp. 113-118.

Siebers, Dennis L., "Liquid-Phase Fuel Penetration in Diesel Sprays" (SAE) Paper 980809, Society of Automotive Engineers, 1998, pp. 71-91, Sandia National Laboratories, US.

* cited by examiner

DEVICES AND METHODS FOR CONDITIONING OR VAPORIZING LIQUID FUEL IN AN INTERMITTENT COMBUSTION ENGINE

The present application is a continuation-in-part of U.S. patent application Ser. No. 11/133,147, filed May 18, 2005.

FIELD OF THE INVENTION

The present invention relates to improving the emission quality of intermittent combustion engines upon fuel consumption by introducing electromagnetic energy, such as laser energy, within a combustion chamber.

BACKGROUND OF THE INVENTION

Hydrocarbon fuels, such as diesel fuel, gasoline, or the like, are useful fuels for intermittent combustion engines. However, to date, most engine designs consume fuel less efficiently than is theoretically possible. Therefore, those in the industry have recognized the potential of significantly improving fuel consumption efficiency and are continuing to develop processes that improve emissions. One area where improvements can be made includes the area of liquid fuel vaporization, particularly with respect to the above mentioned fuels. Typically, gasoline and diesel fuels must be forced into a phase where the fuel can be readily combusted. Gasoline engines, for example, require a spark to initiate combustion. Diesel fuels, on the other hand, tend to combust when subjected to heat and pressure from a combustion chamber, where the temperature increases due to compression, which allows the fuel to be converted from a liquid phase to a vapor phase.

To cite one example, in order for a reciprocating engine to generate power, the fuel must at least partially be vaporized and mixed with air rather than burned slowly in a liquid state (as the engine combustion cycle is typically too short for a slowly burning liquid fuel to burn completely before the exhaust cycle begins). This is particularly a problem with the diesel engine, as the fuel is injected into the combustion chamber in liquid spray form, is vaporized, and becomes self-ignited within the same combustion cycle. Even under normal operating conditions, diesel fuel tends to self-ignite before vaporization is complete. Further, when cold starting a diesel engine, the vaporization is even less complete, exacerbating problems associated with poor emissions. For example, soot can build up due to incomplete combustion of the fuel. Additionally, an increase in other undesirable exhaust emissions can result when the fuel is not completely consumed in the fuel combustion process.

A number of attempts have been made to remedy some of these issues. One of the more common approaches has been to include additives in the diesel fuel. Some additives have been shown to improve the cold starting performance of the engine. Other additives have been shown to improve general fuel combustion performance. However, these additives can increase the cost of already expensive fuels and may not provide optimal results.

As such, it would be desirable to provide methods and devices which lead to more complete vaporization of fuels, thereby resulting in improved fuel efficiency and reduced undesirable emissions.

SUMMARY OF THE INVENTION

It has been recognized that it would be advantageous to develop a fuel conditioning device for more completely vaporizing fuel prior to ignition to thereby increase the fuel efficiency and emission quality of intermittent combustion engines.

The invention provides fuel conditioning devices and methods for conditioning fuels for more complete combustion, all of which utilize functional electromagnetic energy to effectuate a more complete combustion during the combustion cycle. Fuels for which these technologies can be used include gasolines, diesel fuels, oils, alcohols, biodiesels, other alternative liquid fuels, or the like.

In one embodiment of the present invention, a fuel conditioning device is provided. Such a device can include a fuel injector configured to eject a fuel spray along a trajectory within a combustion chamber, an energy source capable of emitting electromagnetic energy, and an optical fiber configured to transmit electromagnetic energy emitted from the energy source to the combustion chamber, and is further configured to cause fuel conditioning at the fuel spray along the trajectory. Fuel conditioning can be carried out without causing ignition using the electromagnetic energy. Optionally, a fuel conditioning device can comprise a laser as the energy source.

In another embodiment, the fuel conditioning device includes a combustion chamber, a fuel injector designed to eject a fuel spray along a trajectory within the combustion chamber, an energy source capable of emitting electromagnetic energy, an energy directing member configured to direct the electromagnetic energy to a region along the trajectory to cause fuel conditioning at the fuel spray, and a rigid housing which houses the electromagnetic energy emitted from the energy source prior to entering the combustion chamber. Fuel conditioning can be carried out without causing ignition using the electromagnetic energy. As before, the energy source is optionally a laser in some embodiments.

In yet another embodiment, a method of conditioning fuel can comprise the steps of injecting a fuel spray along a trajectory within a combustion chamber; and directing electromagnetic energy from an optical fiber into the combustion chamber. The electromagnetic energy of this embodiment is configured to cause fuel conditioning at the fuel spray along the trajectory. Fuel conditioning can be carried out without causing ignition using the electromagnetic energy.

Additional features and advantages of the invention will be apparent from the detailed description which follows, taken in conjunction with the accompanying drawings, which together illustrate, by way of example, features of the invention.

DESCRIPTION OF THE DRAWINGS

In the accompanying drawings which illustrate embodiments of the invention.

DETAILED DESCRIPTION OF THE PREFERRED EMBODIMENT(S)

Figure 1A:
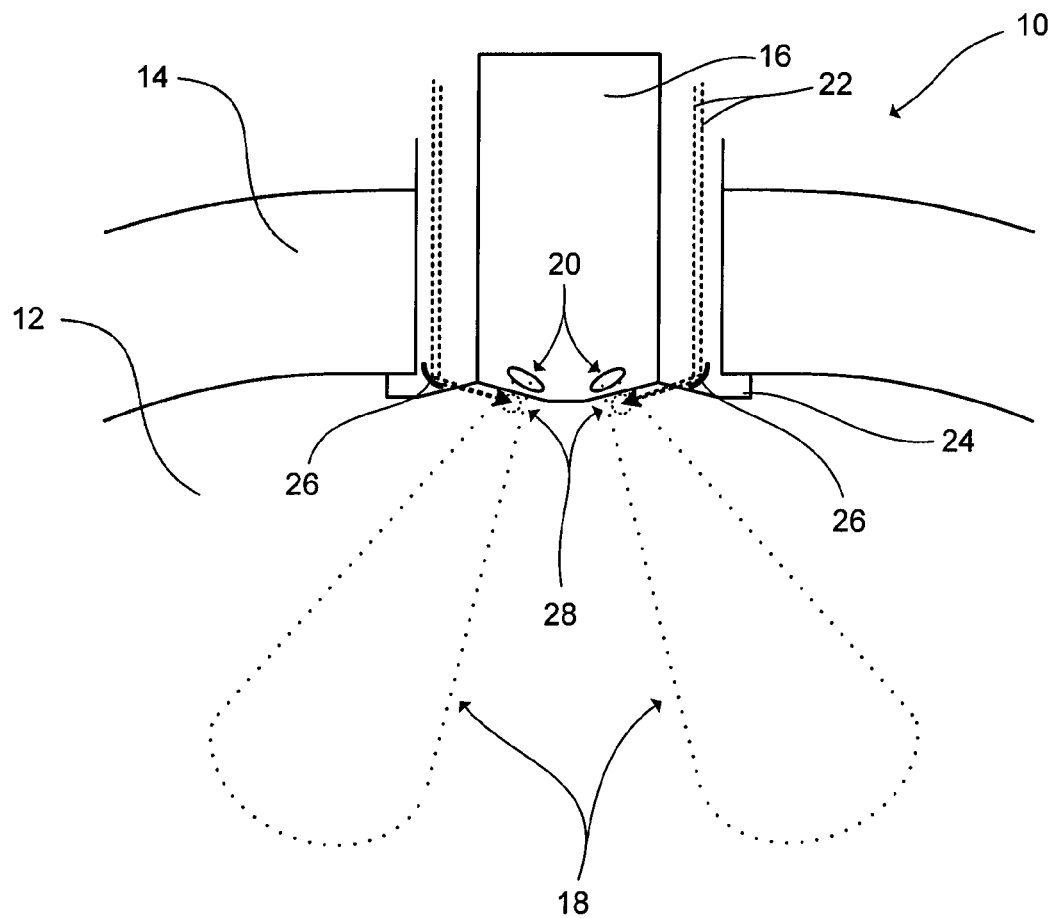
FIGS. 1a and 1b are cross-sectional and bottom schematic views, respectively, of a fuel conditioning device according to an embodiment of the present invention.

Before the present invention is disclosed and described, it is to be understood that this invention is not limited to the particular structures, process steps, and materials disclosed herein as such process steps and materials may vary to some degree. It is also to be understood that the terminology used herein is used for the purpose of describing particular embodiments only and is not intended to be limiting, as the scope of the present invention will be limited only by the appended claims and equivalents thereof.

It must be noted that, as used in this specification and the appended claims, the singular forms "a," "an," and "the" include plural referents unless the content clearly dictates otherwise.

"Focusing limit" refers to a focal limit of electromagnetic energy. Generally, electromagnetic energy may only be focused to a point as small as half of its wavelength. Thus, electromagnetic energy focused in the present invention can be focused in a pattern that is slightly larger than the focusing limit of the electromagnetic energy, but more converged than that provided by the most initial emission from the electromagnetic energy source. This can be referred to as "defocused."

"Volumetric heating" or "volumetric vaporization" includes the use of electromagnetic energy to condition and/or vaporize fuel droplets throughout its volume. In one embodiment, this heating can occur essentially simultaneously throughout the drop volume. This is in contrast to conventional surface heating via conduction and convection. Volumetric heating can occur by achieving molecular resonant absorption, though this is not required. Complete vaporization is not required, though a more complete vaporization can result in an engine which runs with cleaner emissions.

The term "focus" or "focused" when referring to electromagnetic energy, such as laser energy, refers to an area where electromagnetic energy is converging, up to and including at the focusing limit. Typically, as a fuel spray is wider than the focusing limit of the electromagnetic energy used, and as wider focusing areas can cause liquid fuel vaporization, the term "focus" or "focused" does not require that the energy be completely converged. In other words, though within the scope of the present invention, complete focusing to the point of reaching the focusing limit may be less desirable than focusing to a larger size. Focusing to a larger size than the focusing limit can be carried out by using distorted reflective surfaces, non-collimated beams, lenses, off-axis parabola mirrors or reflectors, or other techniques known in the art. Focusing of electromagnetic energy to a region larger than the focusing limit can be referred to as "defocusing." However, it should be noted that the when the term "focus" is used in any context (focus, defocus, etc.), there must be at least some convergence of energy that is more concentrated than that which is generated and provided by the initial electromagnetic energy emission. Focusing can be carried out by the use of a lens, a lens and mirror combination, an off-axis parabola mirror or reflector, etc.

The term "off-axis parabola reflector" or "off-axis parabola mirror" refers to a partial parabolic device having a reflective surface, as known to those skilled in the art. This being stated, it is noted that there are other types of focusing mirrors other than off-axis parabola reflectors. Examples include elliptic, ellipsoid, and spheric mirrors, which can also have "off-axis" properties. Unlike parabolic focusing mirrors, they do not focus collimated (parallel) beam to the diffraction limit. However, in accordance with embodiments of the present invention where mirrors are used for directing electromagnetic energy, and not for focusing toward the diffraction limit, they can likewise be used as in certain embodiments of the present invention.

The term "direct fuel injection" refers to any method or mechanical system by which a fuel is atomized and injected directly into the combustion chamber of an internal combustion engine.

The term "indirect fuel injection" refers to any method or mechanical system which atomizes fuel and does not inject fuel directly into the combustion chamber. Typically, an indirect injection system delivers fuel into a chamber adjacent to the combustion chamber, sometimes known as a pre-combustion chamber, where air-fuel mixture spreads into the main combustion chamber.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention is drawn to a fuel conditioning device, system, and related methods. More particularly, the present invention is drawn toward the use of electromagnetic energy to condition fuel droplets within a fuel spray in order to effectuate more complete vaporization and combustion. For example, in one embodiment, a fuel conditioning device as recited herein can include a fuel injector, an energy source, and an optical fiber. The fuel injector can be configured to eject a sufficient amount of fuel spray along a trajectory within the combustion chamber to create a combustion reaction. Conditioning fuel can occur when electromagnetic energy is emitted from the energy source and transmitted via the optical fiber to the fuel spray. In one embodiment, the optical fiber can transmit and direct the electromagnetic energy along the fuel spray trajectory to effectuate volumetric heating of the fuel spray. In an embodiment, the energy source can be a laser.

In certain specific embodiments, the fuel conditioning device can further comprise a source focusing member configured to focus electromagnetic energy prior to entering the optical fiber. The source focusing member can be a lens, a mirror, a lens and mirror combination, an off-axis parabola reflector (mirror), or any other focusing device that can be used to focus electromagnetic energy. The source focusing member ideally focuses the electromagnetic energy to an extent that the energy may enter and travel through the optical fiber. In a further embodiment, the source focusing member focuses the emitted electromagnetic energy to become transmitted by an optical fiber having a diameter from about 100 microns to about 400 microns. In still another embodiment, more than one optical fiber is used. The number of fibers used can vary depending on the design of the engine, the number of injectors, and the desired outcome. For examples, multiple optical fibers can be used to delivery electromagnetic energy to a single fuel spray, or to different fuel sprays within a combustion chamber.

In another embodiment, the fuel conditioning device can further include a transmitted energy focusing member. The transmitted energy focusing member can be configured so as to focus electromagnetic energy after transmission through the optical fiber, and before conditioning the fuel spray. The focusing member can be a lens, a mirror, a lens and mirror combination, an off-axis parabola reflector (mirror), or any other focusing device that can be used to focus electromagnetic energy.

In yet another embodiment, the optical fiber can be separated from the combustion chamber by a window that is substantially transparent to the electromagnetic energy. This window can also act as a focusing lens. Exemplary materials that can be used for the window include fused silica (acceptable for near infrared with a pass band from 0.7 microns to 2 microns), sapphire (acceptable for near infrared and mid-infrared with a pass band from 0.7 microns to 4 microns), or diamond (acceptable for near infrared, mid-infrared, or far infrared with a pass band from 0.7 microns to 11 microns). It is noted that each of these materials are also transparent in visible to ultra violet ranges, i.e. 0.7 microns is mentioned as it is approximately where infrared begins.

The device outlined herein can be used with direct fuel injection systems as well as indirect fuel injection systems. Furthermore, the device may be used with reciprocating internal combustion engines, gasoline engines, diesel engines, and pulse detonation engines (PDE).

In another embodiment, a fuel conditioning device can comprise a combustion chamber, a fuel injector, and energy source, and energy directing member, and a rigid housing. The fuel injector is configured so as to eject a fuel spray along a trajectory within the combustion chamber. The energy source has the capacity to emit electromagnetic energy. The energy directing member is configured to direct the electromagnetic energy to a region along the trajectory so as to cause fuel conditioning at the fuel spray. The rigid housing is coupled to the combustion chamber or the fuel injector and houses the electromagnetic energy emitted from the energy source prior to entering the combustion chamber. In some embodiments, the energy source is a laser.

In an embodiment, the energy directing member is an optical fiber. The energy directing member may also be some form of an energy focusing member configured so as to focus the electromagnetic energy. The energy focusing member can be a lens, a mirror, a lens and mirror combination, an off-axis parabola reflector (mirror), or any other focusing device that can be used to focus electromagnetic energy.

In another embodiment, besides housing the electromagnetic energy emitted from the energy source prior to entering the combustion chamber, the rigid housing can also at least partially house the energy source. In some embodiments, the rigid housing can be metal or composite material. Furthermore, the rigid housing can be removable from the combustion chamber or fuel injector.

In yet another embodiment, the energy directing member can be separated from the combustion chamber by a window that is substantially transparent to the electromagnetic energy. This window can also act as a focusing lens. Depending on design needs, the window can be a part of the rigid housing. As mentioned above, this window can also act as a focusing lens. Exemplary materials that can be used for the window include fused silica, sapphire, or diamond.

The device including the rigid housing outlined herein can be used with direct fuel injection systems as well as indirect fuel injection systems. Furthermore, the device may be used with reciprocating internal combustion engines, gasoline engines, diesel engines, and pulse detonation engines (PDE).

Further, a method of conditioning fuel is disclosed which can include the steps of injecting a fuel spray along a trajectory within a combustion chamber; and directing electromagnetic energy from an optical fiber into the combustion chamber. The electromagnetic energy can be configured to cause fuel conditioning at the fuel spray along the trajectory. The electromagnetic energy can be directed along the trajectory at a more proximal location from the fuel injector with respect to the entire length of the trajectory within the combustion chamber.

In some embodiments, the trajectory wherein the fuel spray is injected can originate from a fuel injector. In still another embodiment a method of conditioning fuel can apply when the fuel spray is intermittently injected. In one embodiment, the fuel spray can be intermittently injected and the electromagnetic energy can be intermittently emitted. Furthermore, the fuel spray and electromagnetic energy can be configured to be substantially synchronized such that the electromagnetic energy may be present at a laser focusing region for a period of time that corresponds to a time interval when the fuel spray may be traveling within the focusing region along the trajectory.

In yet another embodiment, the electromagnetic energy from the optical fiber may be focused prior to conditioning the fuel. Additionally, and in some preferred embodiments, the electromagnetic energy may be produced by a laser.

Referring now to the FIGS., it is to be noted that certain numerals from one figure to the next denote similar structures. Thus, it is not necessary to re-identify each and every numeral in each and every figure where a new feature is to be described.

Figure 1B:
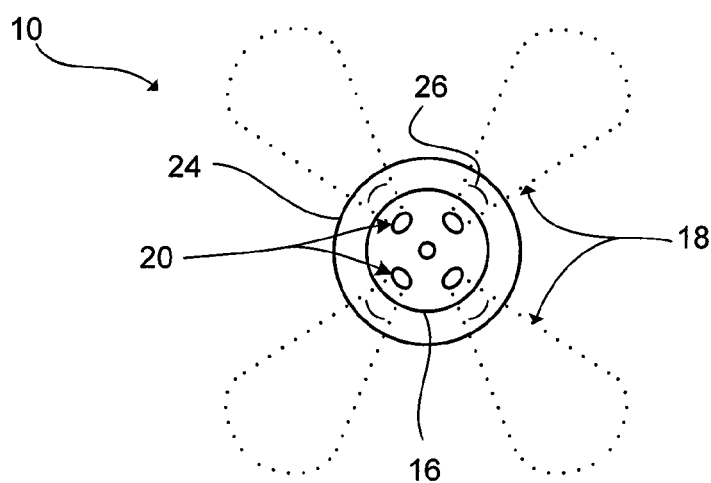

With reference to FIGS. 1a and 1b, a fuel conditioning device 10 for use in an intermittent combustion engine to improve the fuel efficiency and reduce engine emissions is shown. Generally, in the present embodiment, the fuel conditioning device 10 can include a combustion chamber 12 defined by combustion chamber walls 14, a fuel injector 16 including at least one fuel injector aperture 20 for ejecting a fuel spray 18 along a trajectory, and electromagnetic energy 22 having an energy focusing region 28. Further, a coupling ring 24, a focusing member, such as an off-axis parabola reflector 26, and a piston head (not shown) can also be present. Generally, the combustion chamber can be sized to allow movement of the piston head within the chamber walls. Generally, the combustion chamber can be formed into any configuration suitable for fuel combustion, as is known in the art. Usually, the combustion chamber is formed in a typical cylindrical configuration.

A fuel injector 16 can generally be coupled to the combustion chamber walls in some manner, and further configured to intermittently introduce a fuel spray 18 through at least one fuel injection aperture 20 at appropriate times and in conjunction with the cyclic intervals of a piston head, as is known by those skilled in the art. If the combustion chamber 12 is configured for a gasoline engine, then a spark will typically be present to ignite the fuel spray. However, for a diesel engine, no spark is required, but heat and pressure may be required to vaporize and combust the fuel spray. As in most diesel engines, from one to eight (or even more) fuel injector apertures can be positioned within a single combustion chamber.

In addition, the fuel injector can be in direct or indirect fluid communication with the combustion chamber. As is known by those skilled in the art, diesel combustion engines typically are configured such that the fuel injector is in direct fluid communication with the combustion chamber. In an alternative embodiment, the fuel injector can be coupled to a pre-combustion cavity which can be in fluid communication with a combustion chamber. In this embodiment a preliminary fuel conditioning cavity can be positioned such that the fuel spray passes through the fuel conditioning cavity before entering the combustion chamber. In alternative embodiments, the device shown in FIG. 1a can be modified for use in other types of intermittent combustion engines, such as rotary engines or pulse detonation engines (PDE), which can be used in conjunction with jet or rocket engines, for example, as would be known by one skilled in the art after considering the present disclosure.

Optimizing fuel combustion performance of an intermittent combustion engine can be accomplished through various fuel spray patterns. FIG. 1b is a bottom schematic view of a fuel conditioning device according to one embodiment of the present invention. In FIG. 1b, similar structures will be identified with the same numerals as used in FIG. 1a. Accordingly, FIG. 1b illustrates a bottom schematic view of the fuel injector 16 of FIG. 1a, which can include a plurality of fuel injector apertures 20. The number of apertures in a single fuel injector can be dictated by the type of engine, the size of combustion chamber, and/or the fuel spray 18 pattern desired. The current embodiment illustrates four independent apertures, each ejecting fuel spray radially and downward along a diagonal trajectory. The spray pattern configuration and trajectory may be adjusted to any configuration which provides a more efficient fuel spray for volumetric heating or conditioning.

Volumetric heating of a fuel spray 18 may be accomplished by focusing an electromagnetic energy (not shown) along the fuel spray trajectory. An electromagnetic energy source (not shown) can be configured to introduce appropriate electromagnetic energy waves, as shown in FIG. 1a, into the combustion chamber 12. The electromagnetic energy source can be configured to emit electromagnetic energy having a wavelength and power level suitable for volumetrically heating fuel spray droplets within the combustion chamber. Though volumetric heating can be carried out in accordance with an embodiment of the present invention, any type of heating that causes rapid vaporization of a fuel spray can be used. In one aspect of the present invention, an electromagnetic energy source can be a laser, such as a $CO_2$ laser; a solid state laser, e.g., Nd:YAG laser; or semiconductor laser.

By utilizing electromagnetic energy to condition or volumetrically heat fuel prior to ignition, a more complete fuel vaporization may result. For example, in a conventional fuel combustion process, liquid fuel droplets are heated from the surface to the center by conduction and convection. Thus, the exterior of the fuel droplets vaporizes before the interior of the liquid fuel droplets. The vaporized portions will then rapidly combust and the liquid center merely slowly burns. This slow burn of the center of the liquid fuel droplet results in incomplete combustion. Thus, a portion of the fuel droplet is sent out of the combustion chamber as hydrocarbon (HC) or soot rather than as a more fully utilized exhaust, leading to soot build up and undesirable emissions. Conversely, under the right conditions, electromagnetic energy can be used to heat fuel throughout its volume (both inside and out), as opposed to merely heating the surface or skin and relying on heat conduction and convection to heat the inside of the fuel volume. In other words, by utilizing electromagnetic wave energy to heat the fuel droplet prior to ignition, the outer surface of the droplet can be heated substantially simultaneously with the center of the droplet. As a result, little to no liquid center of the fuel droplet remains to slowly burn. Rather, the entire fuel droplet is vaporized volumetrically, and the entire vaporized droplet can be substantially completely combusted.

The electromagnetic energy utilized in the present invention can be any electromagnetic energy having a power level and wavelength sufficient for volumetric heating. There are several frequencies or wavelengths of electromagnetic energy sufficient for heating fuel. In particular, an electromagnetic energy having a wavelength from about 0.4 µm to about 12 µm can be used. In another embodiment, the electromagnetic energy can have a wavelength from about 0.4 µm to about 6 µm. In still another embodiment, the electromagnetic energy is within the infrared range, including far infrared (FIR), mid-infrared (MIR), and near infrared (NIR). For example, laser energy emitted from a $CO_2$ laser device having a wavelength of about 10.6 µm can be used to volumetrically heat fuel spray droplets. It is also noted that millimeter wavelength energy (wavelength from 10 to 1 mm, f=30-300 GHz) as well energy within the visible spectrum can also be used.

In order to effectuate the volumetric vaporization of the fuel, a focusing member, such as an off-axis parabola reflector 26, can be used in accordance with the present invention. The focusing member can be a lens, a combination of a lens and a reflecting device, and/or an off-axis parabola reflector. As will be discussed below, the focusing member, such as an off-axis parabola reflector, can be coupled to the fuel injector 16 or the combustion chamber walls 14. In one aspect, the focusing member can be positioned outside or within the combustion chamber 12. If outside of the combustion chamber, the off-axis parabola reflector can be enclosed and protected from the heat and pressure of a combustion reaction by a transparent window.

FIGS. 1a and 1b illustrates a fuel conditioning device 10 utilizing multiple off-axis parabola reflectors 26 to focus the electromagnetic energy 22 and direct them to a predetermined location along the fuel spray 18 trajectory. The electromagnetic energy used in the present invention can be directed toward the predetermined location such that it corresponds to a focusing region 28, wherein the focusing region is larger than the focusing limit of the electromagnetic energy wave. In other words, the electromagnetic energy may not be completely focused to its focusing limit, but only partially focused (or defocused). This provides the dual ability to increase the focusing pattern of the electromagnetic energy to a larger focusing region, and also allows for providing an appropriate amount of energy density needed to volumetrically heat the fuel spray. In one embodiment, the focusing region can be disposed at a more proximal location from the fuel injector with respect to the entire length of the trajectory within the combustion chamber.

In accordance with an embodiment, as shown in FIG. 1a, a coupling ring 24 can be positioned between the fuel injector 16 and the combustion chamber walls 14 so that electromagnetic energy can pass through and be directed onto a discrete location on the fuel spray 18 trajectory when the fuel spray is present. The ring can be secured to the combustion chamber wall by any securing method such as welding, pressure fitting, threading, bonding, fusing, riveting, to name a few. This embodiment which utilizes the coupling ring allows for a simple way of retrofitting existing combustion chamber/fuel injector assemblies (or existing parts). For example, a larger opening can be machined or cut into the walls of a combustion chamber, the coupling ring can then be placed in the larger opening, and the fuel injector fitted within the coupling ring.

With this arrangement, the coupling ring can be configured to allow electromagnetic energy to pass through the ring (and into the chamber). This can be accomplished by the presence of a window (not shown) that is substantially transparent or translucent to the electromagnetic energy.

Figure 2:
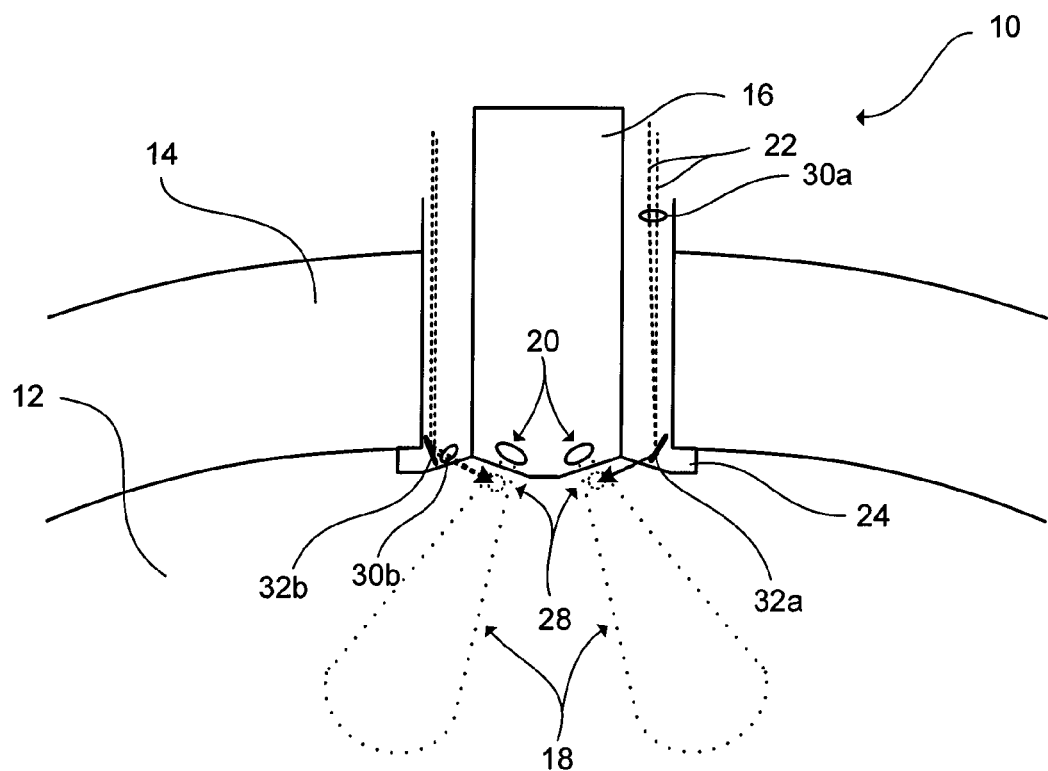
FIG. 2 is a sectional schematic view of an alternative fuel conditioning device in accordance with another embodiment of the present invention.

Referring now to FIG. 2, a fuel conditioning device 10 is shown comprising a combustion chamber 12 defined by combustion chamber wall 14, a fuel injector 16 defining fuel injector apertures 20, electromagnetic energy 22, and a lens 30a or 30b and a substantially planar mirror 32a or 32b as focusing and reflecting members, respectively. In this FIG., two different embodiments are shown, where the lens can be positioned prior to (30a) or after (30b) the substantially planar mirror, as shown. Positioning a lens 30a prior to the substantially planar mirror 32a can allow for a smaller reflective mirror to be utilized. As the electromagnetic energy passes through the lens, the electromagnetic energy becomes more focused and the energy intensity increases. Subsequently, the focused energy can be redirected via the planar mirror to a discrete location or focusing region along the fuel spray trajectory. Also shown in FIG. 2 is an embodiment where the electromagnetic energy is first reflected from a mirror 32b, and then focused by a lens 30b. In either embodiment, the lens and substantially planar mirror can be positioned and secured to the exterior surface of the fuel injector or to the combustion chamber wall. In one embodiment, the focusing member can be coupled to the coupling ring 24.

Figure 3:
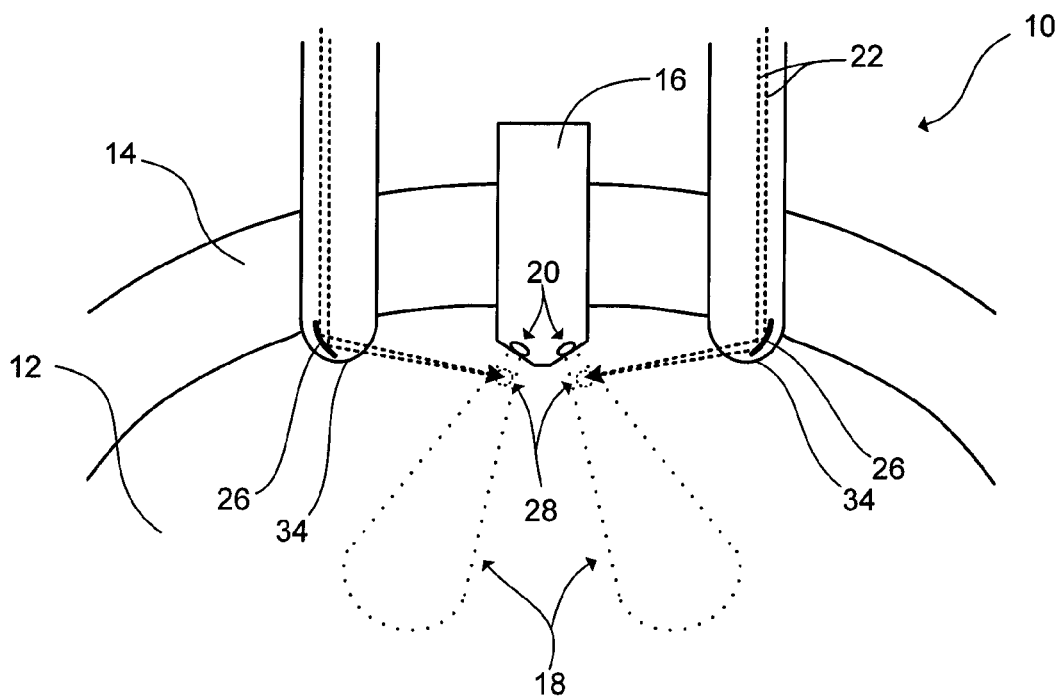
FIG. 3 is a sectional schematic view of another alternative embodiment of the present invention.

In FIG. 3, a fuel conditioning device 10 is shown which can include a fuel combustion chamber 12 defined by combustion chamber walls 14. In addition, a fuel injector 16 can be configured to be in direct fluid communication with the combustion chamber, as shown, or alternatively, the fuel injector can be an indirect fuel injector where a fuel spray is ejected into a pre-combustion chamber rather than being sprayed directly into the combustion chamber (not shown). In the embodiment shown, the fuel injector 16 can be configured for ejecting a fuel spray 18 into the combustion chamber wherein the fuel spray has a predetermined trajectory. At least one energy focusing member, such as an off-axis parabola reflector 26, can be configured to focus the electromagnetic energy to a focusing region and dispose the focused electromagnetic energy along the fuel spray trajectory. In this embodiment, the focusing member can be an off-axis parabola reflector, and can be configured to be more distanced from the fuel injector than as described in FIGS. 1a and 2. Distancing the focusing members from the fuel injector can provide a more proper distance between the electromagnetic energy focusing member and the fuel spray for optimal volumetric heating in some circumstances. Alternatively, rather than modifying the distance, by modifying the focusing power of the focusing member, similar results can be achieved. In one embodiment, the focusing member can be disposed behind a window, within a conduit, or in any other configuration that would allow the energy to be generated, focused, and focused within the combustion chamber along the fuel spray trajectory.

In this embodiment, though only two are shown in cross-section, additional electromagnetic energy assemblies which emit and focus the electromagnetic energy can be present. Typically, these assemblies can be spaced and situated radially around the fuel injector 16, for example. Thus, in one embodiment, each emitted electromagnetic energy beam can be individually associated with a fuel spray, and each can be focused and configured to pass through an appropriate pre-designed focusing region 28. Further, the electromagnetic energy emitting source can emit energy such that energy is concentrated continuously in the energy focusing region, or alternatively, the energy can be intermittently emitted and focused at an appropriate predetermined focusing region such that the intermittently emitted energy is substantially synchronized with the fuel spray cycles. The term "synchronized," does not infer that both fuel spray emission and electromagnetic energy emission are both occurring at the exact same time. More likely, the fuel spay will be configured to be emitted (or pulsed) for a time frame that is advantageous during the fuel spray cycle to effectuate desired fuel conditioning.

Figure 4:
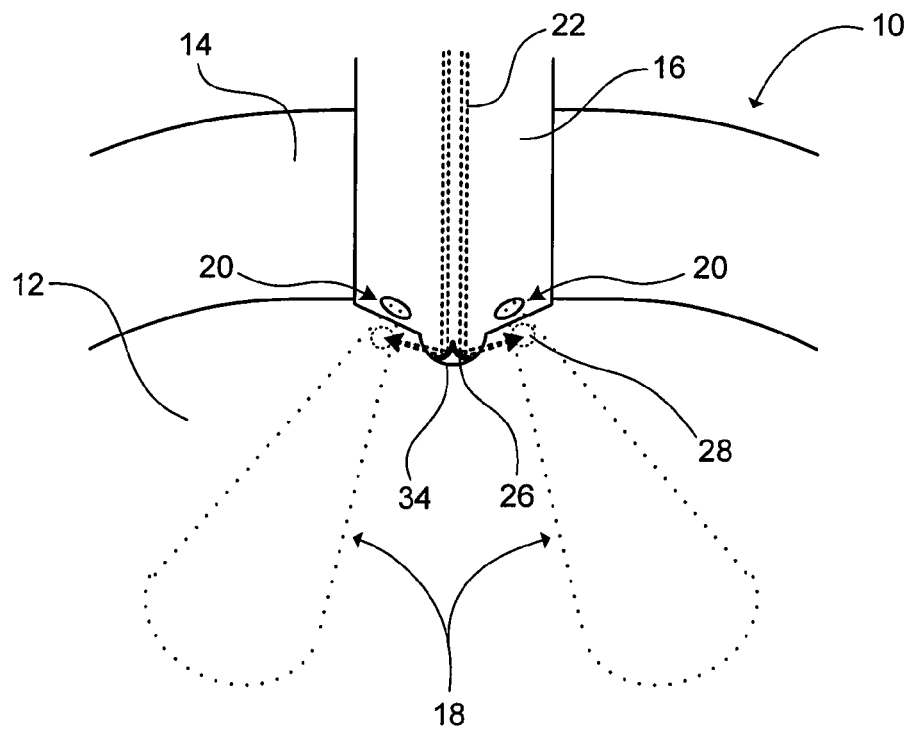
FIG. 4 is a sectional schematic view of yet another embodiment of the present invention.

In FIG. 4, an alternative embodiment of a fuel conditioning device 10 for use with an intermittent combustion engine, such as an internal combustion engine, is shown. Such a fuel conditioning device comprises combustion chamber walls 14 defining a combustion chamber 12. A fuel injector 16 is positioned for injecting fuel into the combustion chamber, and is further configured to house electromagnetic energy within its body. The energy source (not shown) may be within the fuel injector, or may merely provide the energy to a path within the fuel injector. The fuel injector can contain at least one fuel injection aperture 20 capable of allowing ejection of a fuel spray 18 along a trajectory into the combustion chamber. The electromagnetic energy source can emit electromagnetic energy 22 having a wavelength and power level sufficient for fuel conditioning. In the embodiment shown, the energy passes through the fuel injector and is redirected and focused using a focusing member, such as an off-axis parabola reflector 26. It is understood that other types of focusing members can likewise be used in this embodiment. The focusing member is positioned such that reflected energy can pass through a window 34 (transparent or translucent to the energy), which is positioned toward the dispensing end of the fuel injector.

Figure 5:
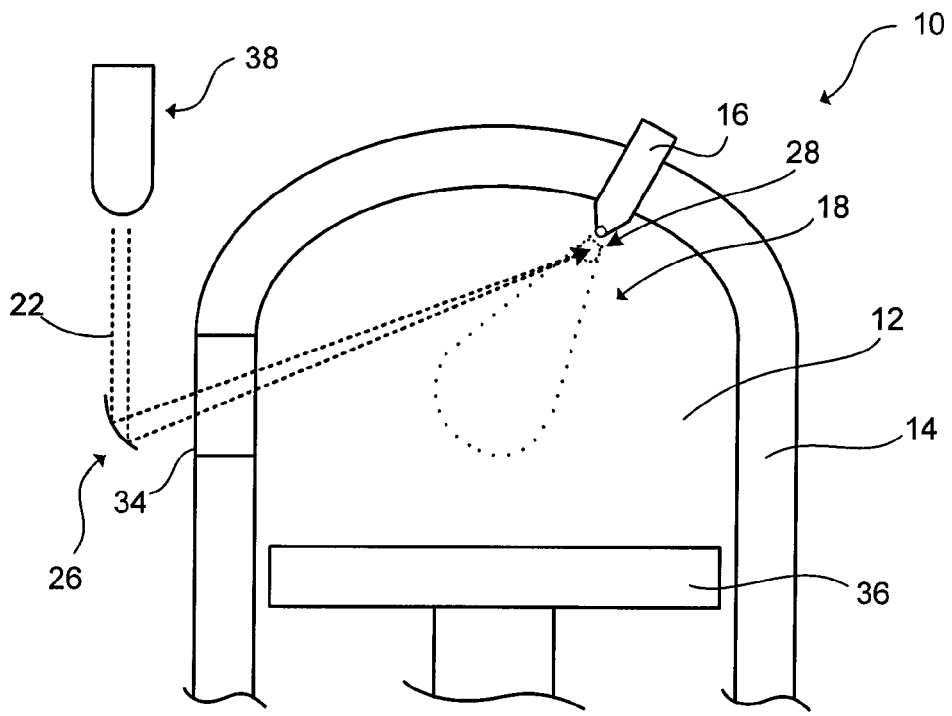
FIG. 5 is a sectional schematic view of another embodiment of the present invention.

In FIG. 5, an embodiment of a fuel conditioning device 10 for use with a fuel injection reciprocating internal combustion engine is shown. Such a fuel conditioning device generally comprises, a combustion chamber wall 14 defining a combustion chamber 12, and a piston head 36. In this embodiment, the combustion chamber wall can optionally be configured for housing a window 34 that is optically transparent or translucent to electromagnetic energy 22. Additionally, the device can also include a fuel injector 16 as shown, as well as a fuel spray 18 which is present at appropriate times in conjunction with the cyclic movement of the piston head, as is known by those skilled in the art. An electromagnetic energy source 38 is also shown which is configured to emit the electromagnetic energy. In this embodiment, the electromagnetic energy source can be located outside the combustion chamber walls, and a focusing member, such as an off-axis parabola reflector 26, can also be positioned outside the combustion chamber and configured to receive, focus, and redirect the electromagnetic energy to a focusing region 28 along a fuel spray trajectory. As the focused energy is reflected onto the trajectory, the focused energy can heat and/or otherwise condition the fuel spray droplets to facilitate more complete fuel combustion.

It should be noted that the embodiments of FIGS. 1-5 can employ optical fibers in transmitting and directing the electromagnetic energy. In order to make that more apparent, however, additional examples specifically employing fiber optics are included below.

Figure 6:
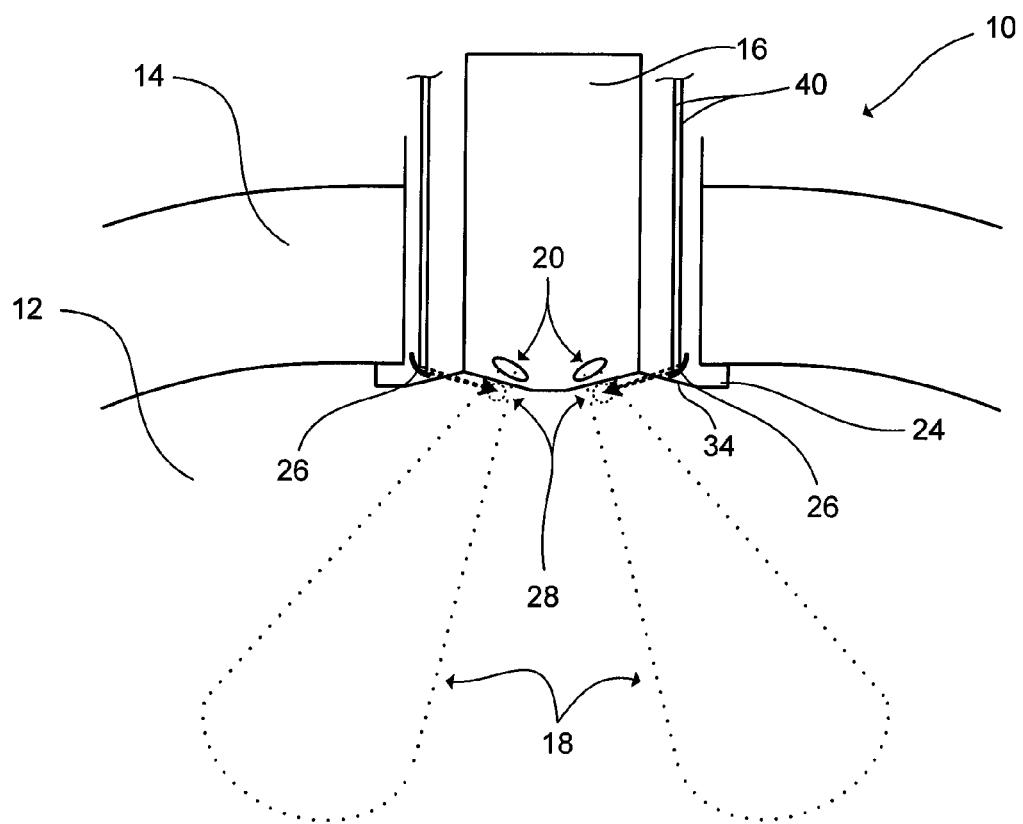
FIG. 6 is a sectional schematic view of an alternative fuel conditioning device in accordance with another embodiment of the present invention.

With reference to FIG. 6, a fuel conditioning device 10 for use in an intermittent combustion engine to improve the fuel efficiency and reduce engine emissions is shown. Generally, in the present embodiment, the fuel conditioning device can include a combustion chamber 12 defined by combustion chamber walls 14, a fuel injector 16 including at least one fuel injector aperture 20 for ejecting a fuel spray 18 along a trajectory, and optical fibers 40 transmitting electromagnetic energy. Although the optical fibers portrayed in FIG. 6 are generally straight, the optical fibers are typically flexible and can take flexible form according to need and design. Also noted on FIG. 6 is an energy focusing region 28, wherein the electromagnetic energy can be directed. Also shown is a rigid housing 24, wherein the electromagnetic energy (and in this case, the optical fibers) is/are housed. Additionally, a transmitted energy focusing member, such as an off-axis parabola reflector 26, and a piston head (not shown) can also be present. Generally, the combustion chamber can be sized to allow movement of the piston head within the chamber walls. Generally, the combustion chamber can be formed into any configuration suitable for fuel combustion, as is known in the art. Usually, the combustion chamber is formed in a typical cylindrical configuration. FIG. 6 also shows windows 34 positioned such that transmitted energy from the optical fiber can pass through the window (transparent or translucent to the energy) and enter the combustion chamber. In this embodiment, the energy is transmitted through the optical fiber, directed and/or focused by a transmitted energy focusing member (the off-axis parabola), and directed through the window and into the combustion chamber and fuel spray trajectory.

A fuel injector 16 can generally be coupled to the combustion chamber walls and further configured to intermittently introduce a fuel spray 18 through at least one fuel injection aperture 20 at appropriate times and in conjunction with the cyclic intervals of a piston head. If the combustion chamber is configured for a gasoline engine, then a spark will typically be present to ignite the fuel spray. However, for a diesel engine, no spark is required, but heat and pressure may be required to vaporize and combust the fuel spray. As in most diesel engines, from one to eight (or even more) fuel injector apertures can be positioned within a single combustion chamber. In addition, the fuel injector can be in direct or indirect fluid communication with the combustion chamber. As is known by those skilled in the art, diesel combustion engines typically are configured such that the fuel injector is in direct fluid communication with the combustion chamber. In an alternative embodiment, the fuel injector can be coupled to a pre-combustion cavity which can be in fluid communication with a combustion chamber. In this embodiment a preliminary fuel conditioning cavity can be positioned such that the fuel spray passes through the fuel conditioning cavity before entering the combustion chamber. In alternative embodiments, the device shown in FIG. 6 can be modified for use in other types of intermittent combustion engines, such as rotary engines or pulse detonation engines (PDE), which can be used in conjunction with jet or rocket engines, for example, as would be known by one skilled in the art after considering the present disclosure.

Volumetric heating of a fuel spray 18 may be accomplished by directing electromagnetic energy (not shown) along the fuel spray trajectory. An electromagnetic energy source (not shown) can be configured to introduce appropriate electromagnetic energy waves, as shown in FIG. 6, into the combustion chamber. The electromagnetic energy source can be configured to emit electromagnetic energy having a wavelength and power level suitable for volumetrically heating fuel spray droplets within the combustion chamber. Though volumetric heating can be carried out in accordance with an embodiment of the present invention, any type of heating that causes rapid vaporization of a fuel spray can be used. In one aspect of the present invention, an electromagnetic energy source can be a laser, such as a $CO_2$ laser; a solid state laser, e.g., Nd:YAG laser; or semiconductor laser.

In order to effectuate the volumetric vaporization of the fuel, the optical fiber can be configured to direct the electromagnetic energy directly to the trajectory, or a transmitted energy focusing member, such as an off-axis parabola reflector 26, can be used in accordance with the present invention. The transmitted energy focusing member can be a lens, a combination of a lens and a reflecting device, and/or an off-axis parabola reflector. As will be discussed below, the transmitted energy focusing member, such as an off-axis parabola reflector, can be coupled to the fuel injector 16, the rigid housing 24, or the combustion chamber walls 14, for example. In one aspect, the focusing member can be positioned outside or within the combustion chamber 12. If outside of the combustion chamber, the off-axis parabola reflector can be enclosed and protected from the heat and pressure of a combustion reaction by a transparent window.

FIG. 6 illustrates a fuel conditioning device 10 utilizing multiple off-axis parabola reflectors 26 to focus the electromagnetic energy from the optical fibers 40 and direct it to a predetermined location along the fuel spray 18 trajectory. The electromagnetic energy used in the present invention can be directed toward the predetermined location such that it corresponds to a focusing region 28, wherein the focusing region is larger than the focusing limit of the electromagnetic energy wave. In other words, the electromagnetic energy may not be completely focused to its focusing limit, but only partially focused (or defocused). This provides the dual ability to increase the focusing pattern of the electromagnetic energy to a larger focusing region, and also allows for providing an appropriate amount of energy density needed to volumetrically heat the fuel spray. In one embodiment, the focusing region can be disposed at a more proximal location from the fuel injector with respect to the entire length of the trajectory within the combustion chamber.

In accordance with an embodiment, as shown in FIG. 6, a rigid housing, also referred to as a casing 24, can be positioned between the fuel injector 16 and the combustion chamber walls 14 so that electromagnetic energy can pass through and be directed onto a discrete location on the fuel spray 18 trajectory when the fuel spray is present. The ring can be secured to the combustion chamber wall by any securing method such as welding, pressure fitting, threading, bonding, fusing, riveting, to name a few. This embodiment which utilizes the rigid housing allows for a simple way of retrofitting existing combustion chamber/fuel injector assemblies (or existing parts). For example, a larger opening can be machined or cut into the walls of a combustion chamber, the rigid housing can then be placed in the larger opening, and the fuel injector fitted within the rigid housing. With this arrangement, the rigid housing can be configured to allow electromagnetic energy to pass through the ring (and into the chamber). This can be accomplished by the presence of a window (not shown) that is substantially transparent or translucent to the electromagnetic energy.

Figure 7A:
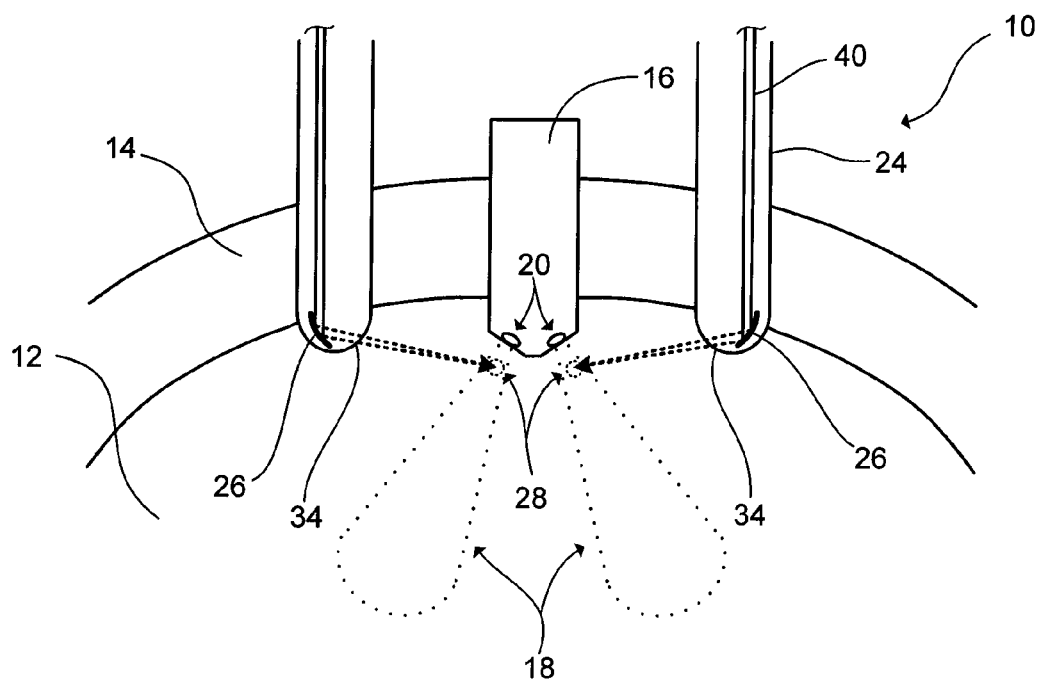
FIGS. 7a and 7b are cross-sectional and bottom schematic views, respectively, of a fuel conditioning device according to an embodiment of the present invention.

In FIG. 7a, a fuel conditioning device 10 is shown which can include a fuel combustion chamber 12 defined by combustion chamber walls 14. In addition, a fuel injector 16 can be configured to be in direct fluid communication with the combustion chamber, as shown, or alternatively, the fuel injector can be an indirect fuel injector where a fuel spray is ejected into a pre-combustion chamber rather than being sprayed directly in the combustion chamber (not shown). In the embodiment shown, the fuel injector can be configured for ejecting a fuel spray 18 from fuel injection apertures 20 into the combustion chamber wherein the fuel spray has a predetermined trajectory. In this embodiment, the optical fibers 40 are configured so as to direct the electromagnetic energy toward an off-axis parabola 26, which directs the electromagnetic energy toward a focusing region 28 along the fuel spray trajectory. Furthermore, the optical fibers travel through optical fiber casing 24 for ease in design and protection of the fiber optics.

Figure 7B:
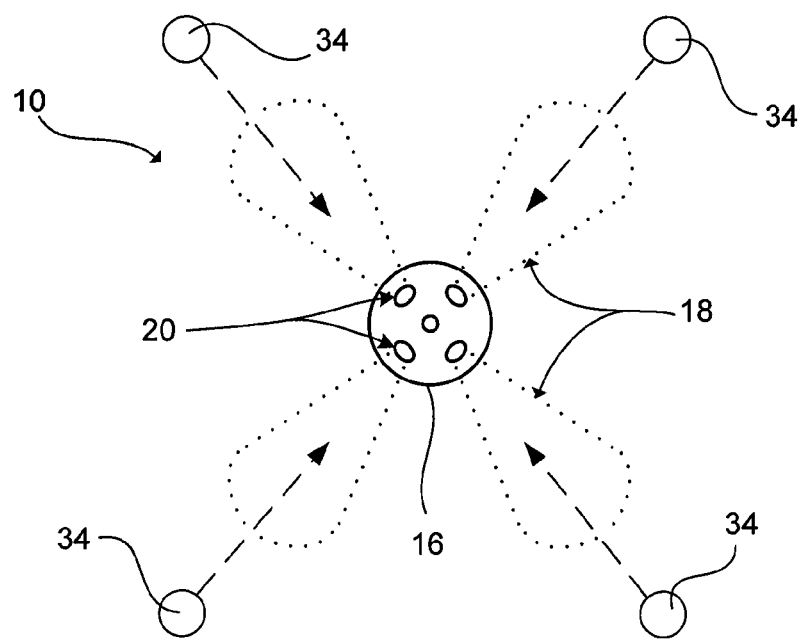

In this embodiment, though only two are shown in cross-section, additional optical fibers that transmit and direct the electromagnetic energy can be present. Typically, these fibers can be spaced and situated radially around the fuel injector 16, for example. Thus, in one embodiment, each optical fiber can be individually associated with a fuel spray, and each can be placed and configured to direct the electromagnetic energy to an appropriate pre-designed focusing region 28. FIG. 7b illustrates another view of the embodiment in FIG. 7a, wherein four optical windows 34 are positioned near the four fuel injection apertures 20, thus allowing the optical fibers (not shown) to transmit or direct electromagnetic energy through the window and into the combustion chamber and into the fuel spray trajectory 18 in order to condition the fuel.

Further, the electromagnetic energy emitting source can emit energy such that energy is intermittently emitted and directed to an appropriate predetermined focusing region such that the intermittently emitted energy is substantially synchronized with the fuel spray cycles. The term "synchronized," does not infer that both fuel spray emission and electromagnetic energy emission are both occurring at the exact same time. More likely, the fuel spay will be configured to be emitted (or pulsed) for a time frame that is advantageous during the fuel spray cycle to effectuate desired fuel conditioning.

Figure 8:
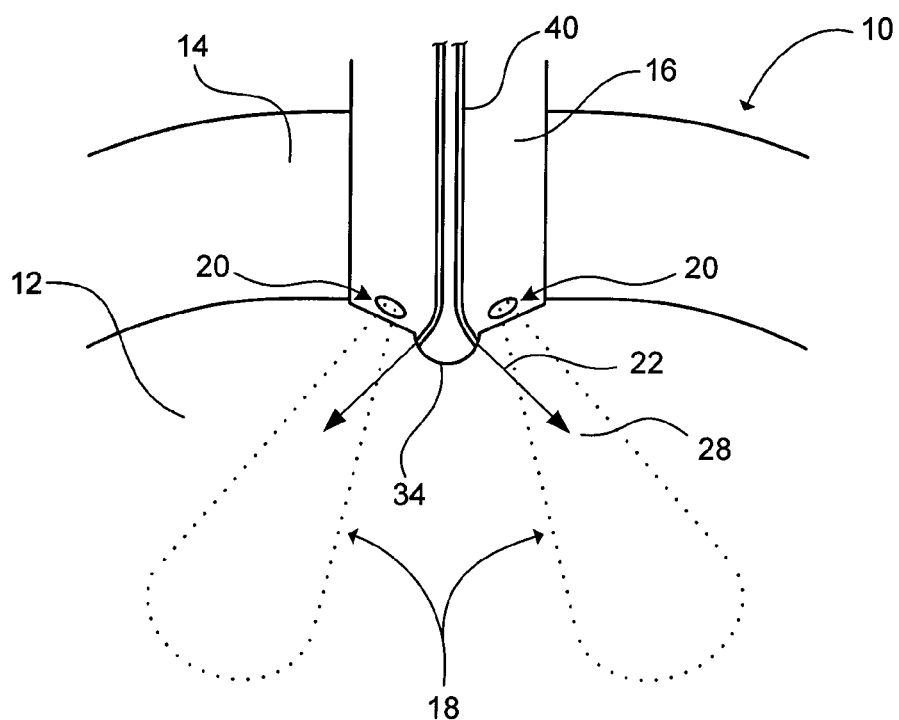
FIG. 8 is a sectional schematic view of still another alternative embodiment of the present invention.

In FIG. 8, an alternative embodiment of a fuel conditioning device 10 for use with an intermittent combustion engine is shown. Such a fuel conditioning device comprises combustion chamber walls 14 defining a combustion chamber 12. A fuel injector 16 is positioned for injecting fuel into the combustion chamber, and is further configured to house fiber optic cables which transmit electromagnetic energy within its body. The energy source (not shown) may be within the fuel injector, or may merely provide the energy to a path within the fuel injector. The fuel injector can contain at least one fuel injection aperture 20 capable of allowing ejection of a fuel spray 18 along a trajectory into the combustion chamber. The electromagnetic energy source can emit electromagnetic energy having a wavelength and power level sufficient for fuel conditioning which is transmitted through the optical fibers 40. In the embodiment shown, the energy passes through the fuel injector via the optical fibers and is directed into the combustion chamber to the desired region along the fuel spray 28 trajectory. The optical fiber is positioned such that transmitted electromagnetic energy can pass through a window 34 (transparent or translucent to the energy), which is positioned such that the electromagnetic energy 22 emitted from the fiber optic line can be directed toward the fuel spray to effectuate fuel conditioning.

Figure 9:
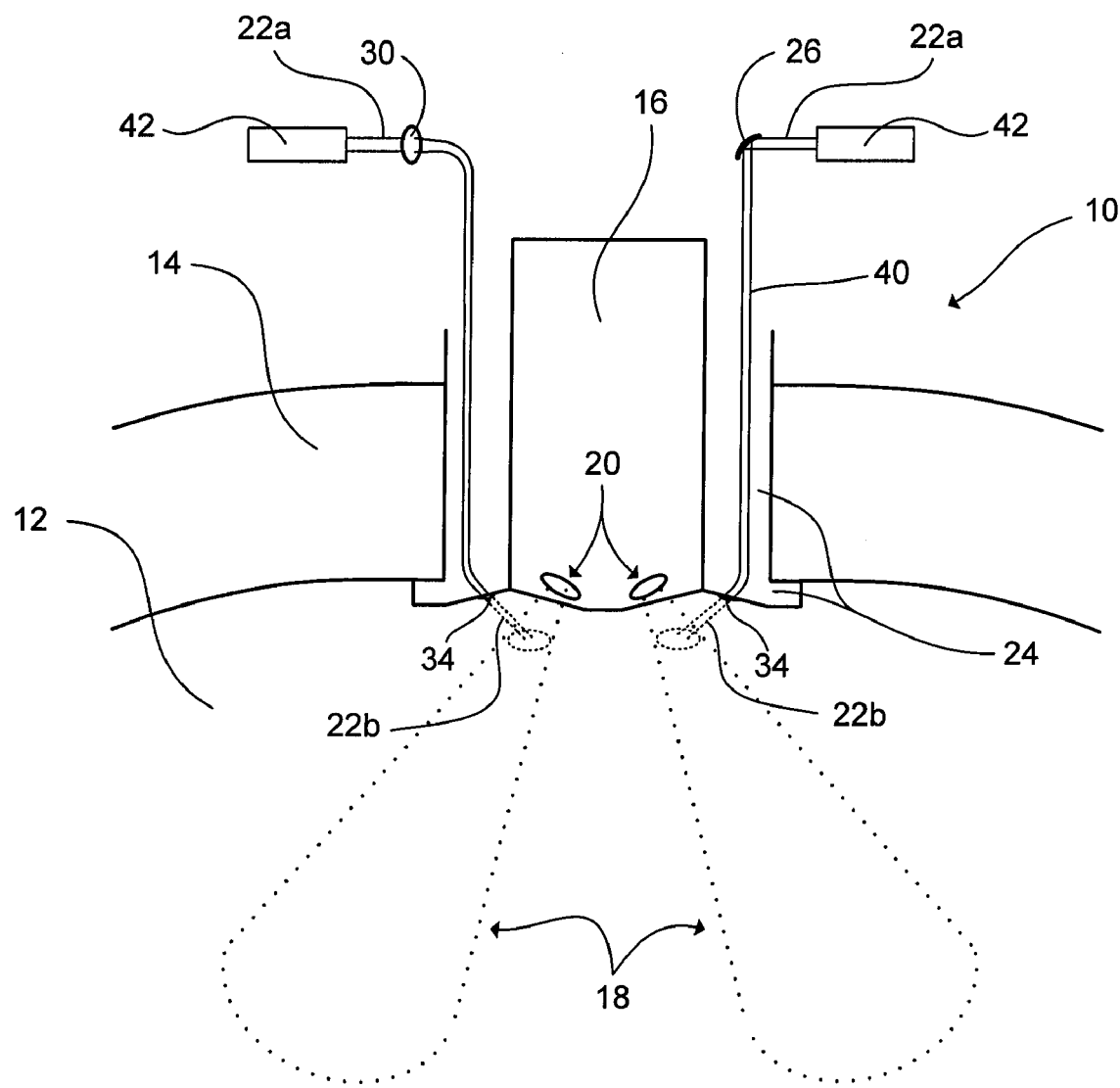
FIG. 9 is sectional schematic view of multiple alternative embodiments of the present invention.

In FIG. 9, an alternative embodiment of a fuel conditioning device 10 for use with an intermittent combustion engine is shown. Such a fuel conditioning device comprises combustion chamber walls 14 defining a combustion chamber 12. A fuel injector 16 is positioned for injecting fuel into the combustion chamber. The fuel injector can contain at least one fuel injection aperture 20 capable of allowing ejection of a fuel spray 18 along a trajectory into the combustion chamber. Such a fuel conditioning devices generally comprises an electromagnetic energy source, in this case, a laser 42. The emitted laser energy 22a is directed to a source focusing member, e.g., lens 30 or off-axis parabola reflector 26, which focuses the electromagnetic energy prior to entering an optical fiber 40. The energy is transmitted through the optical fiber and directed through a window 34 as electromagnetic energy 22b to the trajectory of the fuel spray. In accordance with a preferred embodiment, the optical fiber travels through a rigid housing 24.

As can be seen from the above embodiments, when fiber optics are included, focusing can occur after the energy exits the fiber optic as shown in some embodiments, or alternatively, no focusing is necessary after the electromagnetic energy exits the fiber optic. Further, it is noted that various modifications to the general designs shown and described herein can be carried out in order without departing from the spirit of the present invention. For example, various types of coupling between the fiber optic and the protective window can be carried out within the scope of the present invention. Alternatively, the exit end of the fiber optic can be polished such that the fiber optic can be directly exposed to the interior of the combustion chamber, thus avoid the need to use a separate protective window, i.e., the end of fiber can be modified or configured to withstand the heat and pressure of the combustion that occurs within the chamber. In this embodiment, the fiber optic can be said to terminate within the combustion chamber. For example, a fiber optic fabricated from sapphire could withstand such heat and pressure. In still another embodiment, the window could be formed as a plug that is threaded which can be screwed into an opening like a bolt. Such a plug can be fabricated from sapphire, for example.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A fuel conditioning device, comprising:
   a fuel injector configured to eject a fuel spray along a trajectory within a combustion chamber;
   an energy source capable of emitting electromagnetic energy; and
   an optical fiber coupled to the energy source, wherein the optical fiber is configured to transmit electromagnetic energy emitted from the energy source into the combustion chamber, and is configured to be concentrated and cause fuel conditioning at the fuel spray along the trajectory.

2. The device of claim 1, wherein the energy source is a laser.

3. The device of claim 1, further comprising a source focusing member configured to focus electromagnetic energy prior to entering the optical fiber.

4. The device of claim 3, wherein the source focusing member is a lens.

5. The device of claim 3, wherein the source focusing member is a mirror.

6. The device of claim 3, wherein the source focusing member focuses the emitted electromagnetic energy to within the optical fiber at a diameter from about 100 microns to about 400 microns.

7. The device of claim 1, wherein more than one optical fiber is used.

8. The device of claim 1, further comprising a transmitted energy focusing member, configured to focus electromagnetic energy after transmission through the optical fiber and prior to conditioning the fuel spray.

9. The device of claim 8, wherein the transmitted energy focusing member is a lens.

10. The device of claim 8, wherein the transmitted energy focusing member is a mirror.

11. The device of claim 1, wherein the optical fiber is from about 100 microns to about 400 microns in diameter.

12. The device of claim 1, wherein the optical fiber is separated from the combustion chamber by a window that is substantially transparent to the electromagnetic energy.

13. The device of claim 12, wherein the window comprises fused silica, sapphire, or diamond.

14. The device of claim 12, wherein the window is a focusing lens.

15. The device of claim 1, wherein the optical fiber terminates within the combustion chamber.

16. The device of claim 1, wherein the fuel injector operates as a direct fuel injection system.

17. The device of claim 1, wherein the fuel injector operates as an indirect fuel injection system.

18. The device of claim 1, said device configured for use in a reciprocating internal combustion engine.

19. The device of claim 1, said device configured for use in a gasoline engine.

20. The device of claim 1, said device configured for use in a diesel engine.

21. The device of claim 1, said device configured for use in a pulse detonation engine (PDE).

22. A fuel conditioning device, comprising:
   a combustion chamber;
   a fuel injector configured to eject a fuel spray along a trajectory within the combustion chamber;
   an energy source capable of emitting electromagnetic energy;
   an energy directing member configured to direct the electromagnetic energy to a region along the trajectory to cause fuel conditioning at the fuel spray; and
   a rigid housing coupled to the combustion chamber or the fuel injector which houses the electromagnetic energy emitted from the energy source prior to entering the combustion chamber.

23. The device of claim 22, wherein the energy source is a laser.

24. The device of claim 22, wherein the energy directing member is an optical fiber.

25. The device of claim 22, wherein the energy directing member is an energy focusing member configured to focus the electromagnetic energy.

26. The device of claim 25, wherein the energy focusing member is a lens.

27. The device of claim 25, wherein the energy focusing member is a mirror.

28. The device of claim 22, wherein the energy source is also at least partially within the rigid housing.

29. The device of claim 22, wherein the rigid housing is metal.

30. The device of claim 22, wherein the rigid housing is removable from the combustion chamber or the fuel injector.

31. The device of claim 22, wherein the energy directing member is separated from the combustion chamber by a window that is substantially transparent to the electromagnetic energy.

32. The device of claim 31, wherein the window comprises fused silica, sapphire, or diamond.

33. The device of claim 31, wherein the window is part of the rigid housing.

34. The device of claim 31, wherein the window is a focusing lens.

35. The device of claim 22, wherein the optical fiber terminates within the combustion chamber.

36. The device of claim 22, wherein the fuel injector operates as a direct fuel injection system.

37. The device of claim 22, wherein the fuel injector operates as an indirect fuel injection system.

38. The device of claim 22, said device configured for use in a reciprocating internal combustion engine.

39. The device of claim 22, said device configured for use in a gasoline engine.

40. The device of claim 22, said device configured for use in a diesel engine.

41. The device of claim 22, said device configured for use in a pulse detonation engine (PDE).

42. A method of conditioning fuel, comprising:
   a) injecting a fuel spray along a trajectory within a combustion chamber; and
   b) directing electromagnetic energy from an optical fiber into the combustion chamber, said electromagnetic energy configured to be concentrated and cause fuel conditioning at the fuel spray along the trajectory.

43. The method of claim 42, wherein the trajectory originates from a fuel injector.

44. The method of claim 42, wherein the fuel spray is injected intermittently.

45. The method of claim 44, wherein the step of directing electromagnetic energy is configured to be substantially synchronized with the step of injecting the fuel spray.

46. The method of claim 42, further comprising focusing the electromagnetic energy from the optical fiber, prior to the fuel conditioning.

47. The method of claim 42, wherein a laser produces the electromagnetic energy.

48. The method of claim 42, wherein the electromagnetic energy conditions the fuel spray along the trajectory without initiating ignition.

* * * * *